United States Patent
Teng et al.

[11] Patent Number: 5,976,484
[45] Date of Patent: Nov. 2, 1999

[54] INTERMITTENT CONTINUOUS METHOD FOR RECOVERING REFINED ACTIVATED CARBON FROM WASTE TIRES AND THE LIKE AND THE DEVICE THEREFOR

[76] Inventors: Chien-Lang Teng, No. 119, Hsiu Chi Hsiang, Chang Ping Road, Sec. 2; Feng-Sung Wang, No. 421, Chung Mei Street, both of Taichung, Taiwan

[21] Appl. No.: 08/935,543

[22] Filed: Sep. 23, 1997

[51] Int. Cl.⁶ .................................................. B01J 20/02
[52] U.S. Cl. ........................................ 423/449.7; 502/416
[58] Field of Search ................................ 423/449.7, 461; 201/25; 502/416

[56] References Cited

U.S. PATENT DOCUMENTS

| | | | |
|---|---|---|---|
| 3,945,810 | 3/1976 | Saito | 48/76 |
| 4,284,616 | 8/1981 | Solbakken et al. | 423/461 |
| 4,431,567 | 2/1984 | Gestaut et al. | 502/101 |
| 4,957,721 | 9/1990 | Lonsinger et al. | 423/461 |

*Primary Examiner*—Steven Bos
*Assistant Examiner*—Stuart L. Hendrickson
*Attorney, Agent, or Firm*—Burns, Doane, Swecker & Mathis, L.L.P.

[57] ABSTRACT

A method and device is provided which is capable of producing gasified substance and solid-shaped carbonized substances from solid-shaped wastes such as waste tyres by a series of heating, dry distillation and splitting decomposition. After discharging out from the bottom of a splitting decomposition reactor, the solid-shaped carbonized substances are subject to a series of treatments: water washing, magnetic separating, alkaline cleaning and acid pickling (treatment) to separate out iron wire and to remove heavy metal-bearing ash contents. The carbonized substances are next pulverized to the desired particle size so that highly purified carbon black is formed. Subsequently, the carbon black granules are led into an activation furnace and are heated and activated at the atmosphere of steam being passed in to produce powder particulate activated carbon. On the other hand, from the gasified substance produced by-products of the combustible oil and gas are respectively formed. This combustible oil and/or combustible gas can be led into the splitting decomposition reactor and the activation furnace as fuels for heating on the outside of the furnace and where the remaining portion of which may be sold to the outside. The above process of treatments is accomplished at an intermittent and continuous way and recovery rate of the activated carbon is high whereas the treatment time is shortened.

11 Claims, 2 Drawing Sheets

INTERMITTENT CONTINUOUS METHOD FOR RECOVERING REFINED ACTIVATED CARBON FROM WASTE TIRES AND THE LIKE AND THE DEVICE THEREFOR

BACKGROUND OF THE INVENTION

The present invention relates to a novel intermittent continuous method and device for recovering refined activated carbon from waste tyres and the like and, in particular, to a treatment process to for producing effectively by refining activated carbon with a high added value from waste rubbers such as waste tyres, through an intermittent continuous process of treatments without formation of a secondary public nuisance while the oil-gas produced thereby as a by-product being recovered and used as a source for outer heating in the splitting decomposition and activation thus achieving a recovery of resources, and to a device for use in this process.

Owing to the development in public roads and the popularity of cars and motorcycles, the number in the growth of waste tyres of consummable materials has increased greatly and has been a problem for an immediate resolution on environmental protection.

For solving this problem on waste tyres, generally, three methods have been adopted, these are: burial, incineration and pyrolysis. By burial, the waste tyres are discarded and buried as general garbage and are not regenerated. It is therefore a waste of resources and the method will not be discussed here. As according to the incineration method, the waste tyres are pulverized and the weight (volume) is reduced to become fuel for combustion, mainly for use in burning the specially made boiler to recover the thermal energy thereof to warm houses water, etc. However, because such a method is of a direct combustion, the costs in the treatment of secondary public nuisance on removal of smoke, stink, burned ash and separation of steel wire and in the equipment have become another problem. As regards the splitting decomposition (dry distillation), waste tyres are pulverized and then thrown into a sealed splitting decomposition furnace where the pulverized waste tyres are subject to a high temperature heat splitting decomposition and dry distillation and the gases that are produced by decomposition are then cooled, separated and absorbed to obtain the fuel oil, fuel gas, carbonized substance and steel wire residues while the fuel oil and gas are for general use and part of which can be recovered for use in a thermal decomposition furnace, the ash residues have to be separately buried or magnetically separated to separate out the iron wire with the remaining carbonized substance after pulverization and granulation to produce low grade carbon black for use as packings in the tyre manufacture. Although such a process can have a considerable result in the recovery of resources for reuse and can also reduce the problem of secondary public nuisance in smoke elimination, equipments and the processing system are far from being ideal and the process works by batch only. Operation can be disintegrated and not continuous, and the procedures can be redundant and can result in the wastage of energy resources. The method is much in need for improvement.

Japanese Patent Application No. Showa 58-25384 discloses a method and device whereby waste tyres are thrown directly into an incinerator for combustion, and the gases formed are led out from a smoke outlet. The carbonized substances are recovered via a pipeline while on the other hand, the melted fluid is recovered from the bottom of the incinerator as fuel. This direct and open type incineration method results, however, in the secondary public nuisance of stinking smell and black smoke.

On the other hand, U.S. Pat. No. 5,326,791 teaches a process of splitting decomposition and oil treatment of thermoplastic high molecular compounds and heating hydraulic separation of non-hydrolyzable waste plastics.

However, none of the above cited prior references is involved in the process or system for recovering activated carbon from rubber of any waste tyres or discloses a precise device for possibly recovering activated carbon from the waste tyres; still further, no suggestion has been made that would affect improved method or device in batch splitting decomposition manner for processing the production energy.

SUMMARY OF THE INVENTION

Accordingly, a major object of the present invention is to provide a method for the recovery treatment of waste tyres and the like, whereby waste tyres are thrown into a specially made sealed splitting decomposition furnace of the processing system and through an intermittent and continuous integrated treatment to extract activated carbon and also to obtain by-products of the combustible oil-gas to be used for heating by the system to thereby raise considerably the processing production energy while at the same time lowering the processing cost.

A further object of the present invention is to provide a recovery processing device for waste tyres and the like, where it is capable of intermittently and continuously processing the waste tyres without having to shut down the furnace or to hang it up for cleaning or to replace the tank in the splitting decomposition furnace, and the final product obtained is the activated carbon with a high added value.

A still further object of the present invention is to provide a waste tyre recovery processing system capable of recovering almost all of the waste tyres and returning them into resources thereby solving the problem on environmental protection.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
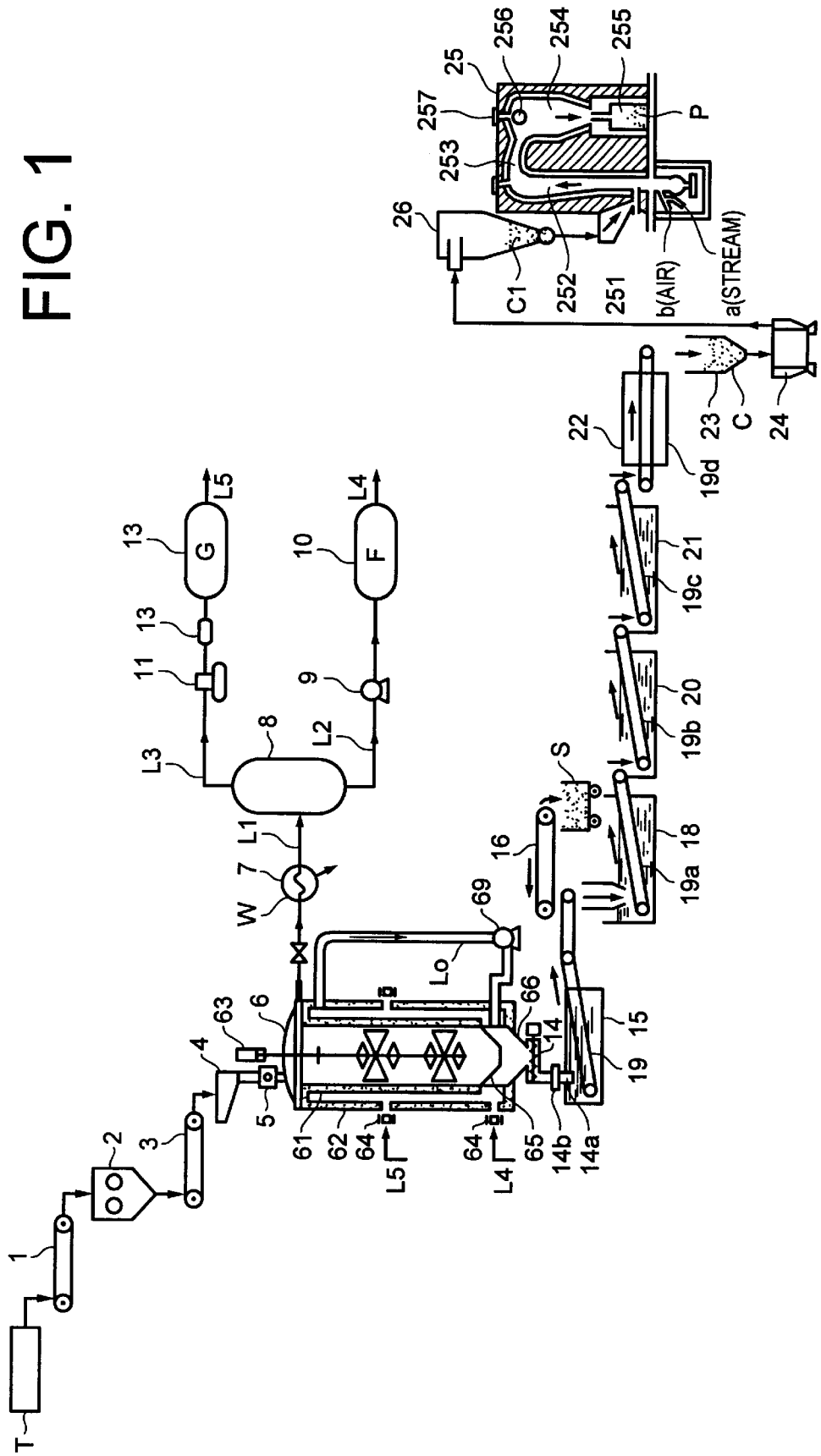
FIG. 1 shown a flowchart of the waste tyre recovery processing system of the invention.
Figure 2:
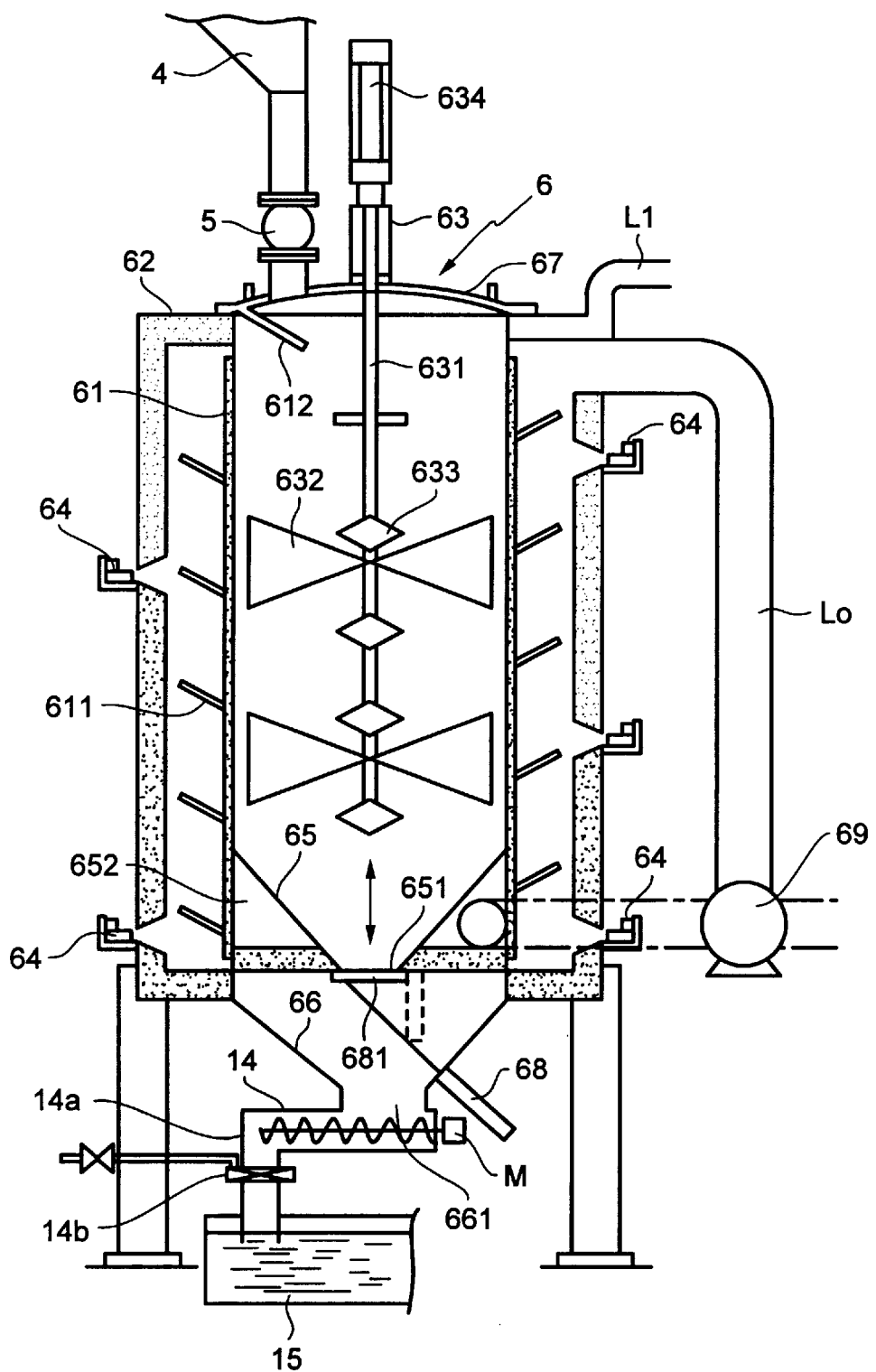
FIG. 2 shows a longitudinal sectional view of the splitting decomposition furnace of the the invention.

With reference to FIGS. 1 and 2, the intermittent and continuous processing system for waste tyres and the like, in accordance with the present invention, will be described in detail as follows.

T denotes waste tyres, 1, conveyer belt and 2, pulverizer, and the waste tyres T are transported via the conveyer belt 1 to pulverizer 2 where they are pulverized into sizes below 5 cm (the smaller the cm the better will be the sizes). The pulverized waste tyres are then transported by a conveyer 3 into a feed tank 4, at the outlet end of the feed tank 4 is disposed a continuous intermittent type pulverized pieces automatic metering and throw-in device 5 for throwing the pulverized waste tyres each time at a determined amount into a splitting decomposition reactor 6. This reactor 6 comprises a double-bottom reaction tank 61 for splitting dry distillation and a closed furnace body 62 encircling the reactor tank 61 for heating the tank. The reaction tank 61 is provided on the inside with an agitator 63, which will be dealt with in detail later.

In the reaction tank 61, the pulverized pieces are gasified after heating and splitting decomposition. The temperature inside the reaction tank 61 is maintained always at 400° C. to 600° C., preferably between 450° C. to 550° C., while the pressure is kept under a pressure of 1.0 to 2.5 kg/cm$^2$. From an outlet at the upper end of the reaction tank 61 the oil-gas MG produced in the gasification is led through a conduct pipe L1 into a condenser 7 where it is cooled to below 50° C. or room temperature and is then passed into an oil-gas separating tank 8. The combustible fluid when condensed, that is, the fuel oil F, is deposited on the bottom of a separating tank 8, and is next forced by a pump 9 to flow through a conduct pipe L2 to an oil storage tank 10 for storage. The non-condensing gases, that is, fuel gas G, is compressed by a compressor 11 and, after passing through a conduct pipe L3 and having impurities and odors absorbed at an absorption tank 12, is then stored in a gas storage tank 13. The fuel oil F and the fuel gas G, thus obtained, are led respectively by conduct pipes L4 and L5 into combustors 64 mounted on the furnace body 62 of the splitting decomposition reactor 6 for combustion in order to heat the reaction tank 61 and the fuel oil F and fuel gas G that are left unused can be supplied to other equipments in the factory or neighboring houses as fuel. Thus, any thermal energy needed for operating the reactor 6 can be supplied from the recovered oil-gas and this can result in a saving of energy resources. On the other hand, if electric heating method is used for heating by the reactor 6, the fuel oil and gas may then be utilized as reserve fuel during power failure.

By analysis, the non-condensing fuel gases are mostly found to be methane and ethane, which having stored in the gas storage tank 13 can be re-used or sold out. On the other hand, the fuel oil can be used as heavy oil in combustion or, if it is necessary for further refining, the fuel oil can be refined into light oil and heavy oil by passing separately through refining equipment of filtering and fractional distillation apparatuses (not shown).

On the other hand, the mainly solid carbonized substances left over in the bottom of the reaction tank 61, namely, the carbon black C, upon reaching a determined amount, are discharged through the upper and lower double cone bottom parts 65 and 66 into the inlet of a screw conveyer 14 at the bottom of the furnace and are again discharged through an outlet feed discharge pipe 14*a* into a carbon black cooling water tank 15 for cooling. Midway of the feed discharge pipe 14*a* is located an obstruction part 14*b* passed with an inert gas such as: nitrogen, which together with a water-sealed portion formed by the cooling water tank 15 constitutes a double-seal action to block the gas, produced as a result of high temperature and low pressure in the reaction tank 61, from joining together with the atmosphere thereby ensuring a double safety.

The cooled carbonized substances C are delivered by a conveyer belting 19 to a magnetic separator 16, where the steel wire S contained in the carbonized substances is adsorbed, separated and next sent into a steel wire tank 17. The carbonized substances C, after having the steel wire S separated out, are then delivered in sequence by means of acid-alkali resistant conveyer beltings or any other suitable devices 19*a*, 19*b* into an alkali bath 18 and an acidic bath 20 where, the substances C are alkaline-cleaned and acidic-pickled to remove the ash content or impurities containing ZnS, ZnO, FeS, Fe$_2$O$_3$ and CaS, which are soluble in acid, and SiO$_2$ which are soluble in alkali. Thereafter, the substances C are sent to a water washing bath 21 for washing with water so as to obtain a pure and clean carbon black C. This carbon black is again sent by a conveyer belting 19*c* into a drying stove 22 in which it is dried. The dried carbon black is then collected in a feed tank 23 and is next sent into a fine grinding machine 24 to be ground into fine powdered carbon C1 of 100 to 200 mesh. Thereafter, the powdered carbon is delivered to a cyclone separator 26 and is separated there to obtain fine carbon powders. The carbon powders are next sent into an activation furnace 25 for activation at a passage of steam and a temperature maintained at above 700° C. The product thus obtained is the activated carbon 9 with a very high degree of purity. Precisely, the fine carbon powder C1 is delivered through a charging hopper 251 into a reaction chamber 252 of the activation furnace 25, the temperature in the reaction chamber 252 is maintained at above 700° C., preferably at 800° C. to 900° C., and into which is also passed air and steam separately, through a steam inlet a and an air inlet b. In the reaction chamber 252, the fine carbon powder C1 is subject to contact with the high temperature and steam and the activation reaction to form activated carbon, which is next sent through a conduct pipe 253 by an airflow into an activated carbon collecting chamber 254 and is again gathered in a collecting barrel 255. As to the waste gases, they are expelled out through an air outlet 256. Furthermore, the numerical reference 257 denotes a normally closed opening for sweeping use.

A detailed construction of the one embodiment of the splitting decomposition reactor 6 utilized in this invention is as shown in FIG. 2, in which the reactor 6 comprises a cylindrical reaction tank 61 and a large-diameter cylindrical furnace body 62 encircling on the outer circumference of the reactor 6. On the circumferential wall of the furnace body 62 is located a plurality of combustors 64 for uniformly heating the interior of the furnace body 62 from upper to lower on all sides thereof. The interior of the reaction tank b1 is provided with an agitator 63 with the upper end supported by an upper cover 67. This agitator 63 has large-and-small size agitating vanes 632, 633 arranged one above the other on a shaft 631 and is capable of performing reciprocating agitating movement in an up and down manner. Thus, when the cylinder 634 is driven, the agitator 63 moves up and down and brings the solid materials inside the reaction tank b1 into an up and down agitating movement so that the solid materials, that have been thrown into the reactor, are exposed to an atmosphere of high-temperature heat. While the materials are sufficiently and evenly heated, at the same time the carbonized substances, that have attached to the inner wall of the tank, are scraped, so that materials can be heated and decomposed in a relatively short time where it helps raise the efficiency of thermal decomposition. The outer wall of the reaction tank 61 is preferably provided with a screw heat absorbing sheet in order to increase the heating area and save energy resources by allowing the flame stagnant time to be extended. The bottom of the reaction tank 61 is formed into an upper and a lower double cone bottom parts 65, 66, an outlet 651 on the bottom of the upper bottom part 65 is closed by a discharge port lower cover 681 of the air cylinder 68 disposed on the outer part of the lower bottom part 66 and capable of opening and closing by extending action. Again, the bottom of the lower bottom part 66 is formed into a feed outlet 661 passing to the inlet of the screw conveyer 14 driven by a motor M. When the air cylinder 68 moves into action and the lower cover 681 is opened with pivot on one end by means of its own body weight, the carbonized substances that have stored up in the reaction tank 61 fall into the lower bottom part 66 by the own body weight thereof and the up and down velocity pressure of the agitator 63 and from the feed outlet 661 the substances enter the screw conveyer 14. When discharge of the carbonized substances is finished, the air cylinder 68 is started again and pushes the lower cover 681 upwardly to cover the outlet 651 tightly. In order to allow the pulverized materials to enter the reaction tank 61 and thereafter to be dispersedly scattered in the tank, the feeding hole of the tank is preferably equipped at the lower part with a dispersion plate 612.

The high-temperature air exhaust on the furnace body 62 of the reactor 6 can be led by conduct pipe L0 and dispenser 69 to the lower portion of the upper bottom part 65 and the drying room or to any other devices where a heat resource is required, for re-use.

Owing to special design of the reactor 6, the materials, which have been thrown into the reactor, are dispersed and fall down scatteringly, and by up and down agitating movement of the agitator 63 in the reaction tank 61 the materials appear to be in a floating and scattering states. This, while reducing the speed in the fall-down, extends also the contacting time with the hot air whereby the surface area of the materials appears to be in maximum limit of an effective heating surface and because the tank bottom 65 is provided with many heat transfer sheets 621 to absorb the exhaust heat content coming from the dispenser 69, the materials on reaching the tank bottom 65 thus possess a good heat transfer effect. Hence, the entire reaction process can be finished within a short time.

The splitting decomposition reaction is an endothermic reaction and in the conventional batchwise large-volume filling-type reaction, a very large quantity of heat is needed so as to adequately supply the quantity of heat required in the reaction. Nevertheless, according to the present invention, the materials are thrown into the reaction tank in small scale each time in an intermittent and continuous manner and thus a large quantity of heat is not required. Furthermore, since according to the present invention the reaction proceeds at a state of up and down agitating motion, it is thus possible to finish the reaction in a very short period and depending on the composition of the materials and the size of the pulverized particles, the time may generally be from 30 to 50 min., which will and also help in a saving of heat energy.

During the alkaline cleaning of the carbonized substances, 2% to 3.5% NaOH solution is preferably used, whereas in the acid pickling (treatment) 7% to 15% HCl solution is generally preferred. After the alkaline cleaning and the acid pickling, the ash content of the carbonized substances may fall to below 3%. Because by the alkaline cleaning only SiO is dissolved and the majority of the ash content will not dissolve in alkali but is dissoluble in acids, therefore, from an economical point of view the alkaline cleaning step may be omitted if necessary, and the acid treatment only is to be followed.

After a treatment in accordance with the method of the present invention of a mixture of waste tyres of different brands, the following contents are obtained, in which the fuel gas is about 10% to 12%, the fuel oil, about 25% to 30%, the activated carbon, about 50% to 55%, the steel wire, 10% to 12% and the others, about 5% to 9%.

Again, according to the steam activation method of the present invention, the activation process may be completed within a short time of a few minutes and the purified carbon black is activated at two types of temperature of 800° C. and 900° C., respectively, to obtain the activated carbon, the property of which is as follows (Table 1).

TABLE 1

| Activation Temperature | 800° C. | 900° C. |
| --- | --- | --- |
| Recovery Rate (%) | 85.8 | 82.2 |
| Adsorptive Capacity Methylbenzene g/g Activated Carbon | 32.7 | 35.2 |
| BET Surface Area ($m^2/g$) | 627 | 852 |
| Single-point Surface Area ($m^2/g$) | 619 | 843 |

It is to be appreicated that the pulverized pieces of waste tyres from the upper part of the reaction tank 61 are metered and thrown into the device intermittently and by the external heat under agitation in the reaction tank 6, the pulverized pieces perform the intermittent and continuous splitting decomposition reaction to produce oil-gas and the carbonized substances. The oil-gas after cooling and separating forms the fuel gas and the fuel oil for use by the reactor and in addition to that, the carbonized substances that have accumulated in the tank are expelled out intermittently. The substances, after absorption of steel wire by the magnetic separator and subject to the alkaline and acid treatments to first remove the ash content and next subject to purification, are activated by steam to form the activated carbon. This process, under the most effective system, has achieved the effectiveness in completely reducing the amount of waste tyres and in the recovery of resources.

DESCRIPTION OF REFERENCE NUMERALS

| T | waste tyres | 18 | alkaline cleaning |
| --- | --- | --- | --- |
| 1 | conveyer belt | 19 | conveyer belting |
| 3 | conveyer | 20 | acid pickling bath |
| 4 | feed tank | 21 | water washing |
| 5 | automatic metering device | 22 | drying stove |
| 6 | reactor | 23 | feed tank |
| 61 | reaction tank | 24 | grinding machine |
| 62 | furnace body | 25 | activation furnace |
| 63 | agitator | 251 | hopper |
| 64 | combustor | 252 | reaction chamber |
| 65 | upper bottom part | 254 | activated carbon collecting chamber |
| 66 | lower bottom part | 255 | collecting barrel |
| 67 | upper cover | 2 | pulverizer |
| 7 | condenser | 26 | cyclone separator |
| 8 | oil-gas separating tank | 611 | heating absorbing sheet |
| 9 | pump | 612 | dispersion plate |
| 10 | oil storage tank | 68 | air cylinder |
| 11 | compressor | 681 | lower cover |
| 12 | absorption tank | 69 | dispenser |
| 13 | gas storage tank | | |
| 14 | screw conveyer | | |
| 15 | cooling water tank | | |
| 16 | magnetic separator | | |
| 17 | steel wire tank | | |

We claim:

1. A method for converting waste tires into a refined activated particulate carbon material and combustible gaseous materials by a dry distillation reaction that is effected using a reaction system comprising the following elements and comprising the following steps:

(i) pulverizing waste tires in a pulverizer into fragments of a size suitable for conversion into gaseous materials and solid carbonized materials when subjected to a dry distillation reaction;

(ii) intermittently introducing said fragments into a holding feed tank which feeds into a splitting decomposition reactor or directly into a splitting decomposition reactor in controlled amounts such that said fragment are converted continuously by a dry distillation reaction into gaseous materials and solid carbonized substances, wherein said splitting composition reactor comprises the following elements:

(a) a dispersion plate that provides for the dispersion of materials in the reaction chamber;

(b) a reaction chamber;

(c) an agitator that provides for up or downward agitation of solid and gaseous materials in the reaction chamber;

(d) a means for heating the content of the reactor to temperatures that allow for the dry distillation reaction to proceed;

(e) an outlet situated at the upper portion of the reactor that provides for the release of gaseous materials which are produced during the dry distillation reaction; and (f) a double-bottom through which solid carbonized materials produced during the distillation reaction can be released;

(iii) allowing said dry distillation reaction to proceed continuously in said reactor thereby providing for the continuous production of gaseous materials and solid carbonized materials;

(iv) releasing said gaseous materials as the reaction proceeds through said outlet situated at the top of the reactor and condensing said gaseous materials to produce a combustible oil and a combustible gas mixture which are then separated from one another;

(v) optionally recycling a portion of said separated combustible oil or combustible gas and using same to heat the splitting composition reactor;

(vi) further releasing the solid carbonized materials produced during the continuous distillation reaction through the double-bottom portion of the reactor and introducing said materials into a screw conveyer device which does not allow for outside gaseous to enter the reaction chamber during said release;

(vii) converting said solid carbonized materials that are introduced into the screw conveyer into a refined activated carbon material by a process comprising the following steps:

(1) cooling and washing with water;

(2) magnetic separation to remove any metal contaminates;

(3) separate alkaline and acid washing steps;

(4) granulation; and (5) addition of granules into a flow steam activation furnace to produce a refined activated particulate carbonized material.

2. The method of claim 1 wherein said dry distillation reaction is effected at a temperature ranging from 400° to 600° C.

3. The method of claim 2 wherein said reaction is effected at a temperature ranging from 450° to 550° C.

4. The method of claim 1 wherein said reaction is effected at a pressure ranging from 0.1 to 2.5 kilograms/centimeter$^2$.

5. The method of claim 1 wherein said gaseous materials are condensed by cooling at a temperature below 50° C.

6. The method of claim 5 wherein said condensed materials are purified to remove impurities and odors.

7. The method of claim 1 wherein the screw conveyer comprises a discharge pipe and outlet that is located below the water surface of a cooling water bath wherein the solid carbonized materials are washed and cooled and said discharge pipe comprises an obstruction means that comprises an inert gas which functions as a double seal to prevent gas from entering the reaction chamber during release of solid carbonized materials from the double-bottom portion of the reactor.

8. The method of claim 1 wherein at least some of said combustible oil or combustible gas is used to heat the reactor.

9. The method of claim 1 wherein magnetic separation is effected using a magnetic separator.

10. The method of claim 1 wherein acid and alkaline washing results in the removal of ash and impurities comprising $ZnS$, $ZnO$, $FeS$, $Fe_2O_3$, and $CaS$ which are acid soluble and $SiO_2$ which is alkali soluble.

11. The method of claim 1 wherein said carbonized materials are ground into fine powder carbon of 100 to 200 mesh.

* * * * *